United States Patent
Fujinuki et al.

(10) Patent No.: US 8,576,237 B2
(45) Date of Patent: Nov. 5, 2013

(54) SCREEN TRANSFER APPARATUS AND METHOD THEREOF AND PROGRAM STORAGE MEDIUM

(75) Inventors: Mitsue Fujinuki, Tokyo (JP); Shinya Murai, Kawasaki (JP); Kensaku Yamaguchi, Kawasaki (JP); Shogo Yamaguchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 870 days.

(21) Appl. No.: 12/404,983

(22) Filed: Mar. 16, 2009

(65) Prior Publication Data
US 2009/0324110 A1 Dec. 31, 2009

(30) Foreign Application Priority Data
Jun. 30, 2008 (JP) .................................. 2008-170586

(51) Int. Cl.
G06F 12/02 (2006.01)
(52) U.S. Cl.
USPC .......................................... 345/544; 382/232
(58) Field of Classification Search
USPC ................... 345/544, 232; 382/232
See application file for complete search history.

(56) References Cited

U.S. PATENT DOCUMENTS

| 5,875,270 A | * | 2/1999 | Nakamura | 382/232 |
| 6,707,939 B1 | * | 3/2004 | Weinholz et al. | 382/164 |
| 7,245,396 B2 | * | 7/2007 | Sakamoto | 358/1.9 |
| 2008/0016246 A1 | * | 1/2008 | Singh | 709/247 |
| 2009/0002275 A1 | | 1/2009 | Yamaguchi | |

FOREIGN PATENT DOCUMENTS

| JP | 06-168097 | | | 6/1994 |
| JP | 06168096 A | * | | 6/1994 |
| JP | 06168097 A | * | | 6/1994 |
| JP | 2004-086550 | | | 3/2004 |
| JP | 2004086550 A | * | | 3/2004 |
| JP | 2004-215173 | | | 7/2004 |
| JP | 2004215173 A | * | | 7/2004 |

OTHER PUBLICATIONS

Ziv, J. et al., "A Universal Algorithm for Sequential Data Compression," IEEE Transactions on Information Theory, vol. IT-23, No. 3, pp. 337-343, (May 1977).
Notice of Rejection issued in corresponding Japanese Patent Application No. 2008-170586 mailed Feb. 3, 2012, 2 pages.

* cited by examiner

*Primary Examiner* — Said Broome
*Assistant Examiner* — Peter Hoang
(74) *Attorney, Agent, or Firm* — Finnegan, Henderson, Farabow, Garrett & Dunner, L.L.P.

(57) ABSTRACT

An apparatus that communicates with a screen display apparatus: a generation unit configured to generate image data to be displayed on a screen; an identification unit configured to identify an overlapping area that overlaps with the image data for each of a plurality of divided areas into which the screen is divided, respectively; a division unit configured to divide respective partial image data belonging to the respective overlapping areas in a vertical direction or a horizontal direction of the screen; a data compression processor configured to compress respective divided image data belonging to the respective divided areas by using dictionary data obtained based on a predetermined amount of divided image data compressed in the past belonging to the respective divided areas; and a data transmission unit configured to transmit respective compressed image data belonging to the respective divided areas in an order defined according to a rule given in advance.

15 Claims, 9 Drawing Sheets

SCREEN TRANSFER APPARATUS AND METHOD THEREOF AND PROGRAM STORAGE MEDIUM

CROSS REFERENCE TO RELATED APPLICATIONS

This application is based upon and claims the benefit of priority from the prior Japanese Patent Applications No. 2008-170586, filed on Jun. 30, 2008; the entire contents of which are incorporated herein by reference.

BACKGROUND OF THE INVENTION

1. Field of the Invention

The present invention relates to a screen transfer apparatus and a method thereof, and a program storage medium storing a program for performing the method.

2. Related Art

Screen transfer systems that compress time-varying screen contents of a personal computer and transmit the compressed screen contents in real time use a reversible data compression or irreversible data compression algorithm to compress image data.

One of frequently used reversible data compression algorithms is an LZ77 method (slide dictionary method) (see Jacob Ziv and Abraham Lempel, "A Universal Algorithm for Sequential Data Compression", IEEE Transactions on Information Theory, Vol. IT-23, No. 3, PP. 337-343, May 1977).

The LZ77 method uses a certain amount of most recently encoded or decoded data as dictionary data when carrying out compression (encoding) and expansion (decoding) processing.

In order to increase the hit rate of a dictionary to obtain a high compressibility, it is necessary to continuously provide data having a possibility that identical character strings may appear repeatedly as input data. On the contrary, the compressibility decreases when pieces of data from sources unrelated to one another are arranged alternately and encoded.

Therefore, when both the transmitting side and receiving side of a communication path attempt to reduce the amount of transmission/reception data using a data compression technique as in the case of a screen transfer system, if there are a plurality of data sources of different characteristics, a high compressibility is more likely to be obtained by assigning dedicated dictionaries to respective pieces of data from all sources, compressing the data separately and multiplexing the compressed data rather than compressing the respective pieces of data using the same dictionary.

Thinking of image data displayed on a personal computer screen handled by the screen transfer system here, when only some narrow areas in the screen area is viewed, it is often the case that all of image data of the narrow areas may be part of the same graphics and the all of the image data are similar contents. However, when the entire screen is viewed, images of different natures such as characters and graphics are displayed in different areas, and therefore an optimum compressibility may not be obtained using the method of compressing image data of any area on the screen using a single dictionary. Therefore, there is a demand for a method of transmitting image data to be displayed on the screen at a high compressibility. Furthermore, it is also necessary not to reduce visibility of the user in this case. For example, when screen contents of a PC (Personal Computer) are written horizontally, if updated screen contents are drawn in the horizontal direction a plurality of times at a large time interval, there can be a problem that it is difficult to understand screen contents in the middle of drawing.

SUMMARY OF THE INVENTION

According to an aspect of the present invention, there is provided with a screen transfer apparatus that communicates with a screen display apparatus that displays image data on a screen, comprising:

an image data generation unit configured to generate image data to be displayed on the screen;

an area identification unit configured to identify an overlapping area that overlaps with the image data for each of a plurality of divided areas into which the screen is divided, respectively;

a division unit configured to divide respective partial image data belonging to respective overlapping areas in a vertical direction or a horizontal direction of the screen to generate divided image data for the respective divided areas, respectively;

a data compression processor configured to compress respective divided image data belonging to the respective divided areas by using dictionary data obtained based on a predetermined amount of divided image data compressed in the past belonging to the respective divided areas so that compressed image data are generated for the respective divided areas; and a data transmission unit configured to transmit respective compressed image data belonging to the respective divided areas in an order defined according to a rule given in advance.

DETAILED DESCRIPTION OF THE INVENTION

Hereinafter, embodiments of the present invention will be explained.

First Embodiment

Figure 1:
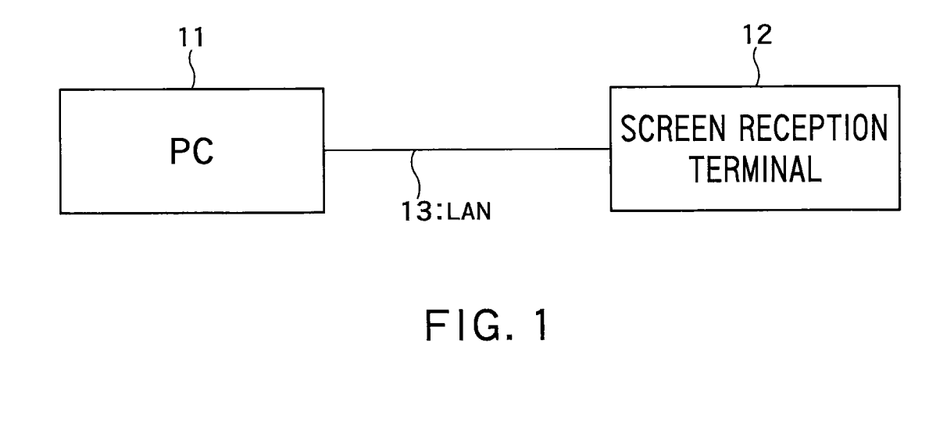
FIG. 1 shows a configuration of a screen transfer system according to a first embodiment.

FIG. 1 shows a schematic configuration of a screen transfer system according to the present embodiment. In FIG. 1, a personal computer (PC) 11 and a screen reception terminal (screen display apparatus) 12 are connected together via a LAN (Local Area Network) 13. The PC 11 corresponds, for example, to a screen transfer apparatus.

The PC 11 is installed with a program for carrying out screen transmission in addition to general application programs and executes this program to compress image data for expressing contents to be displayed on the screen of the PC 11, generate compressed image data and transmit the generated compressed image data to the screen reception terminal (screen display apparatus) 12 via the LAN 13.

The screen reception terminal (screen display apparatus) 12 receives the compressed image data from the PC 11, expands the compressed image data and displays this on a screen.

Figure 2:
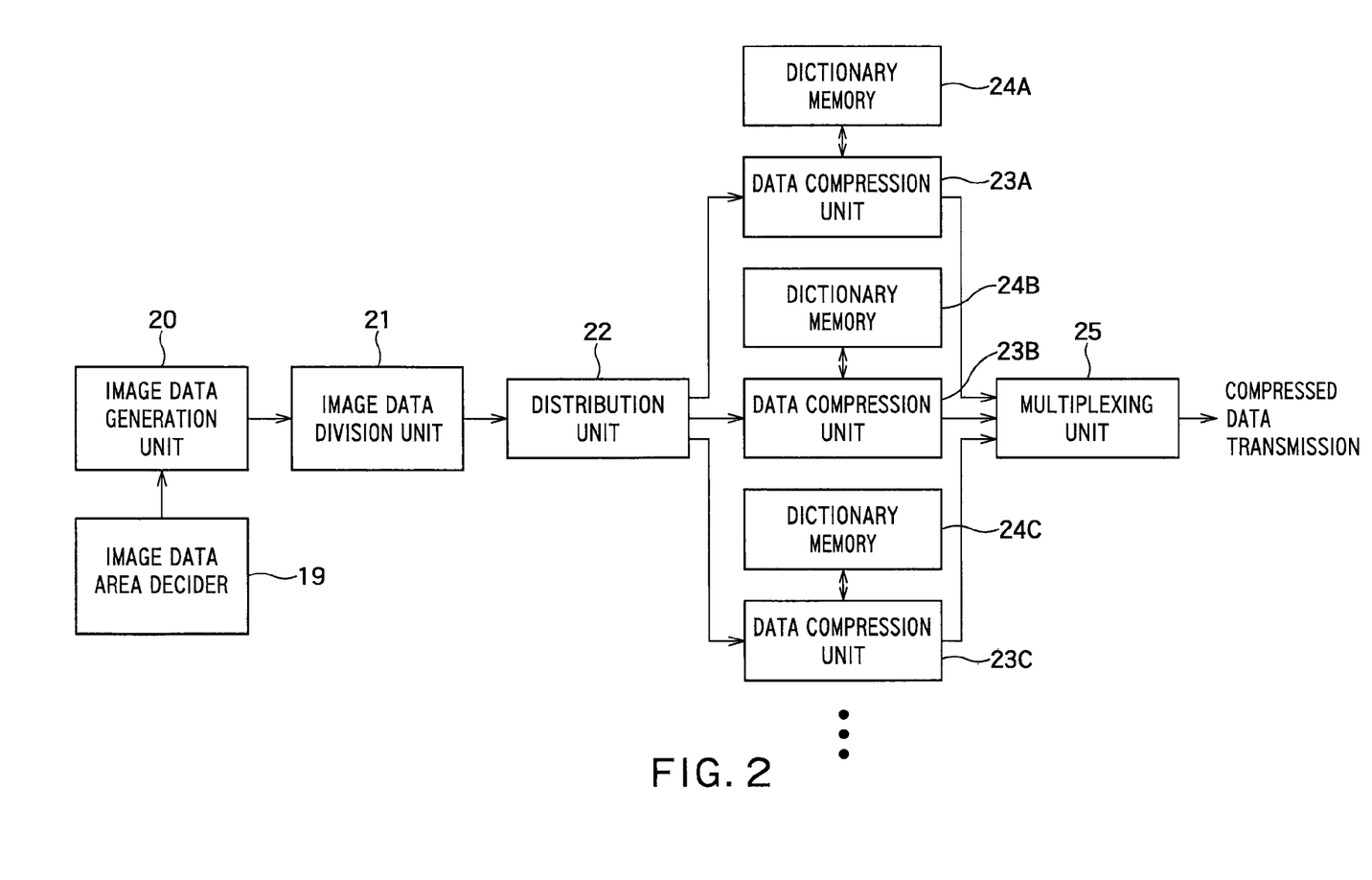
FIG. 2 shows a configuration of a screen transfer apparatus as the first embodiment.

FIG. 2 is a functional block diagram of the PC (screen transfer apparatus) 11 and particularly shows only parts related to the present invention.

An image data area decider 19 decides an area in which image data to be displayed on the screen of the screen reception terminal (screen display apparatus) 12 is drawn and inputs information of the area obtained through the decision to an image data generation unit 20. The area obtained through the decision is the entire screen or part thereof.

The image data generation unit 20 generates image data to be displayed on the screen of the screen reception terminal (screen display apparatus) 12 in the area decided by the image data area decider 19. The image data generated is image data of an updated part of the entire screen or image data of the entire screen.

An image data division unit 21 decides an overlapping area which overlaps with the image data generated above (see FIG. 4 which will be described later) in each of a plurality of divided areas resulting from dividing the screen of the screen reception terminal (screen display apparatus) 12. The image data division unit 21 includes an area identification unit that identifies an overlapping area that overlaps with the image data generated above for each divided area, for example.

Furthermore, the image data division unit 21 divides partial image data belonging to each overlapping area in a vertical direction or horizontal direction of the screen by a predetermined width and generates divided image data (see FIG. 5 which will be described later). When, for example, characters are written horizontally from top to bottom, the image data is divided in the vertical direction and when characters are written vertically from right to left, the image data is divided in the horizontal direction (details will be described later). The image data division unit 21 includes a division unit that divides partial image data belonging to each overlapping area in the vertical direction or horizontal direction. The image data division unit 21 inputs the divided image data generated for each divided area to a distribution unit 22.

The distribution unit 22 distributes divided image data belonging to respective divided areas to data compression units 23A, 23B, 23C, . . . belonging to the respective divided areas. The data compression units 23A, 23B, 23C, . . . are provided in correspondence with their respective divided areas. For example, the data compression unit 23A corresponds to a divided area (rectangular area) 32A in FIG. 4, the data compression unit 23B corresponds to a divided area 32B and the data compression unit 23C corresponds to a divided area 32C. The data compression unit 23A compresses the divided image data sent from the distribution unit 22 using data (dictionary data) in a dictionary memory 24A and furthermore updates the data (dictionary data) in the dictionary memory 24A to latest contents. More specifically, the data compression unit 23A updates the dictionary memory 24A so that a predetermined amount of divided image data compressed in the past is always kept as dictionary data. The predetermined amount of divided image data compressed in the past is, for example, a predetermined amount of divided image data compressed immediately before compressing the divided image data.

The data compression unit 23B, data compression unit 23C, . . . and dictionary memory 24B, dictionary memory 24C, . . . are similar to the data compression unit 23A and dictionary memory 24A.

Here, the data compression units 23A, 23B, 23C, . . . can be merged into one data compression processor (however, the dictionary memories remain plural). In this case, the data compression processor may identify a dictionary memory to be used for compression according to the rectangular area to which the divided image data to be compressed corresponds, use the identified dictionary memory and compress the divided image data.

The compressed image data obtained in the data compression unit 23A, 23B, 23C, . . . are sent to a multiplexing unit (data transmission unit) 25.

The multiplexing unit 25 sends out the compressed image data received from the data compression units 23A, 23B, 23C, . . . to the LAN 13 in order following a rule given in advance and thereby multiplexes the compressed image data for transmission. When, for example, compressed image data at higher positions in the vertical direction of the screen are earlier transmitted and when a plurality of compressed image data are located at the same height, compressed image data closer to the left side in the horizontal direction of the screen are earlier transmitted (see arrows in FIG. 5, which will be described later).

Hereinafter, the PC (screen transfer apparatus) 11 will be explained in further detail.

Figure 3:
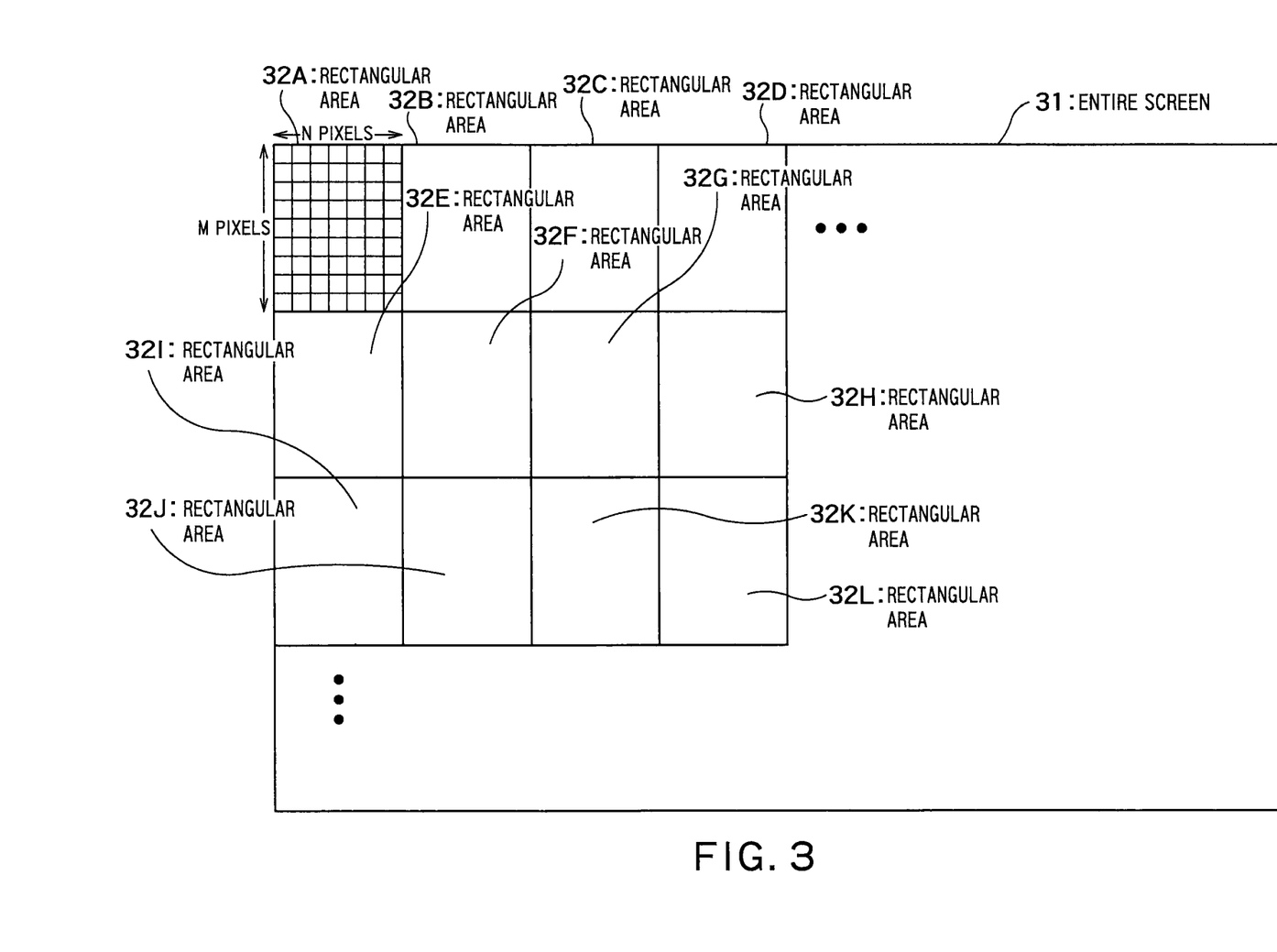
FIG. 3 shows an example of screen division of the first embodiment.

FIG. 3 shows an example of division of an entire screen 31 in the PC 11 or the screen reception terminal (screen display apparatus) 12.

The entire screen 31 is divided into small rectangular areas (divided areas) 32A, 32B, 32C, . . . each having N pixels in the horizontal direction and M pixels in the vertical direction. As described above, one dedicated dictionary memory is assigned to each rectangular area. That is, the dictionary memory 24A is assigned to the rectangular area 32A, the dictionary memory 24B to the rectangular area 32B, and so on.

Figure 4:
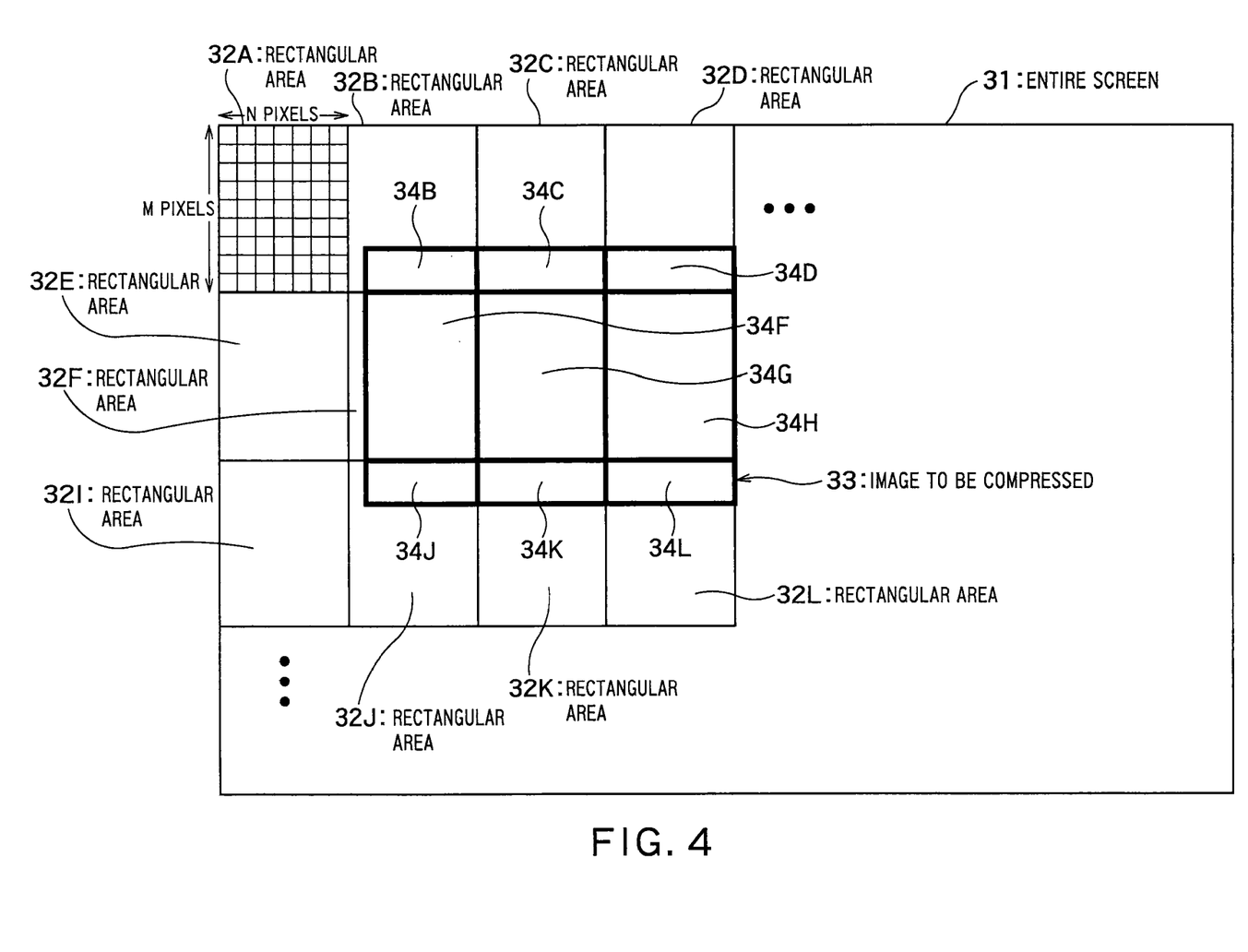
FIG. 4 illustrates an operation of the image data division unit of the first embodiment.

FIG. 4 illustrates identification processing of an overlapping area by the image data division unit 21 as an example.

Overlapping areas with the rectangular areas 32A, 32B, 32C, . . . are decided for a compression target image 33 generated by the image data generation unit 20 of the PC 11. That is, overlapping areas that overlap the above described compression target image 33 (corresponding areas) are identified for the respective divided areas. In the example shown in the figure, the compression target image 33 corresponds to (overlaps with) rectangular areas 32B to 32D, 32F to 32H, 32J to 32L, and the overlapping areas 34B to 34D, 34F to 34H, and 34J to 34L are identified.

Figure 5:
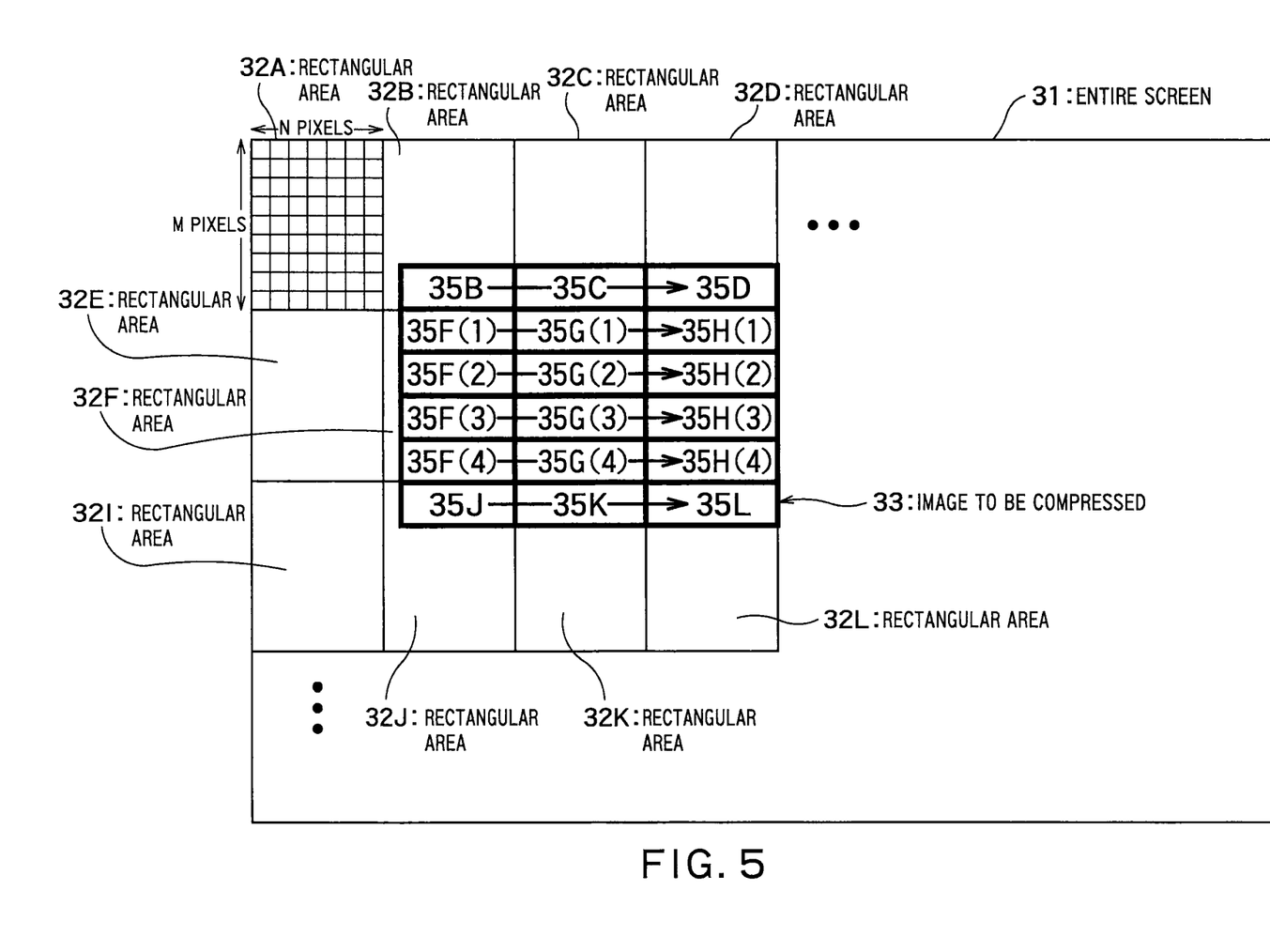
FIG. 5 illustrates operations of the image data division unit, distribution unit, data compression unit and multiplexing unit 25 of the first embodiment.

FIG. 5 illustrates the operations of division processing by the image data division unit 21, distribution unit 22, data compression units (23A, 23B, 23C, . . . ) and multiplexing unit 25 as an example.

The image data division unit 21 divides image data (partial image data) belonging to the overlapping areas (34B to 34D, 34F to 34H, 34J to 34L) in the vertical direction of the screen and generates divided image data. In the example shown in the figure, the image data of the overlapping area 34B is divided into one portion and divided image data 35B is generated, and the image data of the overlapping area 34F is divided into four portions and divided image data 35F(1) to 35F(4) are generated. In this case, the vertical width of division can be set to, for example, on the order of the vertical size of character font displayed on the screen reception terminal (screen display apparatus) 12 or smaller.

Furthermore, when performing division, a higher compressibility can be expected by following rules shown below. The compression algorithm used in the present embodiment is a compression algorithm according to the LZ77 method and this compression algorithm is roughly based on Huffman coding and slide dictionary compression. The "slide dictionary compression" is a compression method whereby data is stored in a buffer (dictionary) before compression, and when the same arrangement as a pattern of data stored so far is found, the "distance" by which the data is tracked back to the data pattern in the buffer (i.e. a distance from a tail end of data in stored in the buffer to the data pattern stored in the buffer) and the "length" of the data pattern (slide width) are substituted for the data to be compressed and thereby the overall size is reduced. For example, when the compression target is a character string: "abcdeabcdfg" and the compression result is "abcde54fg," "54" included in this compression result "abcde54fg" means that "data is tracked back five characters ahead and data corresponding to four characters is repeated (copied)." That is, in this example, the "length" (slide width) corresponds to four characters. Therefore, in the division of image data in the present embodiment, a high compressibility can be expected by making the data size of the divided image data equal to or greater than the length of the data pattern that can be copied (substitutable) and equal to or less than the capacity of the dictionary memory. Furthermore, the specification of Zlib (LZ77 method) defines that the range (distance) within which data can be tracked back is 32 [KB] ahead (therefore, a maximum capacity of dictionary memory is 32 [KB]), and the length (slide width) of a data pattern that can be copied is 258 [bytes].

The distribution unit 22 distributes the respective divided image data obtained by the image data division unit 21 to the data compression units (23A, 23B, 23C . . . ) corresponding to the divided areas to which the respective divided image data belong. For example, since divided image data 35F(1) to 35F(4) (not shown) obtained by dividing the image data of the overlapping area 34F are included in the rectangular area 32F, these divided image data are sent to the data compression unit 23F corresponding to the rectangular area 32F.

The data compression units (23A, 23B, 23C . . . ) compress the distributed divided image data using the corresponding dictionary memories (24A, 24B, 24C . . . ), then update the dictionary memories (24A, 24B, 24C . . . ) and send the compressed divided image data to the multiplexing unit 25. For example, the data compression unit 23F compresses the divided image data 35F(1), updates the dictionary memory 24F (not shown) and sends the compressed image data to the multiplexing unit 25. Next, the data compression unit 23F compresses the divided image data 35F(2), updates the dictionary memory 24F (not shown) and sends the compressed image data to the multiplexing unit 25. Next, the data compression unit 23F compresses the divided image data 35F(3), updates the dictionary memory 24F (not shown) and sends the compressed image data to the multiplexing unit 25. Next, the data compression unit 23F compresses the divided image data 35F(4), updates the dictionary memory 24F (not shown) and sends the compressed image data to the multiplexing unit 25.

As shown by arrows (→) in FIG. 5, the multiplexing unit 25 sends the divided image data 35B, 35C, 35D arranged at the highest positions in the screen in this order (from the left). Next, the multiplexing unit 25 sends the divided image data 35F(1), 35G(1), 35H(1) arranged at the next highest positions in this order (from the left). Hereafter, the multiplexing unit 25 lowers the height by one step at a time and sends divided image data in units of a horizontal row at the same height in a sequential order. By so doing, as will be described later, when characters are written horizontally from top to bottom, the direction in which the user reads characters matches the direction in which characters are displayed, characters are also displayed at high speed and visibility improves. It is assumed here that image data closer to the left side in the screen at the same height are transmitted earlier (i.e. with higher priority), but on the contrary, image data closer to the right side in the screen may be transmitted with higher priority or may be transmitted in random order. This can also improve visibility.

In the example shown in the figure, image data at higher positions are transmitted with higher priority, but on the contrary, image data at lower positions may also be transmitted with higher priority according to contents to be displayed on the screen. That is, the divided image data 35J, 35K, 35L are transmitted in this order or any order first, and the divided image data 35F(4), 35G(4), 35H(4) are then transmitted in this order or any order, and so on.

Such control over the transmission order may be performed by, for example, assigning values indicating the transmission order to the divided image data to be sent out from the distribution unit 22. Or such control may be performed by the distribution unit 22 by adjusting timing for sending out the divided image data to the respective data compression units so as to satisfy the above described transmission order. Or such control may be performed by the distribution unit 22 by directly controlling the timing of transmission of the multiplexing unit (data transmission unit) 25. In the example of transmission of the compressed image data described here, the compressed image data corresponding to one piece of divided image data is transmitted one by one (e.g., in order of 35B→35C→35D), but 35B, 35C, 35D may also be transmitted once as a whole. Alternatively, 35B to 35L (that is, the entire area 33) may be transmitted once as whole.

Figure 6:
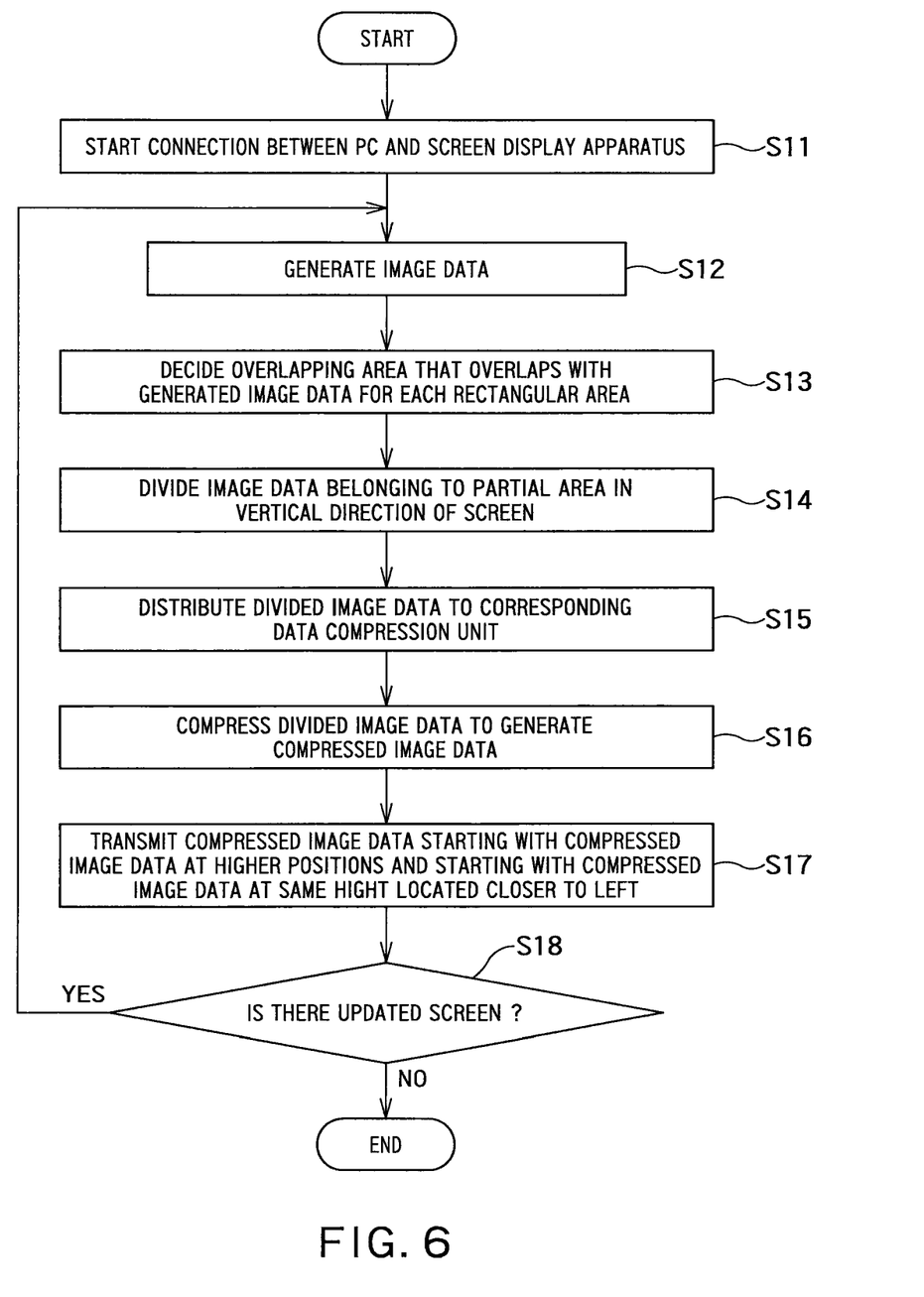
FIG. 6 is a flowchart showing an example of processing flow of the screen transfer apparatus.

FIG. 6 is a flowchart showing an example of processing flow by the PC (screen transfer apparatus) 11.

First, suppose the connection between the PC 11 and screen reception terminal (screen display apparatus) 12 is started (S11).

In this case, the entire screen is decided as the area to be drawn by the image data area decider 19 and image data of the whole contents of the screen is generated by the image data generation unit 20 (S12).

Since the image data generated is the entire screen data, the image data division unit 21 decides that the generated image data overlaps with (corresponds to) all the rectangular areas 32A, 32B, 32C, . . . , and therefore the rectangular areas 32A, 32B, 32C, . . . themselves become overlapping areas 34A, 34B, 34C, . . . (S13).

The image data division unit 21 divides the image data belonging to the respective rectangular areas 32A, 32B, 32C, . . . (that is, overlapping areas 34A, 34B, 34C, . . . ) in the vertical direction of the screen respectively (S14). For example, the image data of the rectangular area 32A (that is, overlapping area 34A) is divided into the divided image data 35A(1), 35A(2), . . . and the image data of the rectangular area 32B (that is, overlapping area 34B) is divided into the divided image data 35B(1), 35B(2), . . . . The same applies to the other rectangular areas.

The respective divided image data are sent to the corresponding data compression units 23A, 23B, 23C, . . . by the distribution unit 22 (S15). For example, the divided image data 35A(1), 35A(2), . . . obtained for the rectangular area 32A are sent to the data compression unit 23A and the divided image data 35B(1), 35B(2), . . . obtained for the rectangular area 32B are sent to the data compression unit 23B.

The data compression units 23A, 23B, 23C, . . . compress the received divided image data according to the contents of the dictionary memories 24A, 24B, 24C, . . . (S16). Furthermore, the most recently compressed data are stored in the dictionary memories 24A, 24B, 24C, . . . using the algorithm of the LZ77 method. When the capacity of the dictionary memory reaches an upper limit, data are erased sequentially starting with the oldest data.

The divided image data compressed by the data compression units 23A, 23B, 23C, . . . are transmitted by the multiplexing unit 25 in order following a rule given in advance (here, those located at higher positions first and then those located closer to the left side in the screen are transmitted with higher priority) (S17) (see FIG. 5).

Next, suppose the screen contents are updated (YES in S18) and then the same area as that of reference numeral 33 in FIG. 4 is decided by the image data area decider 19 as the area to be drawn and image data to be updated is generated by the image data generation unit 20 (S12). When the screen contents are not updated (NO in S18), the processing end.

The image data division unit 21 decides that the generated image data to be updated overlap the rectangular areas 32B to 32D, 32F to 32H and 32J to 32L as shown in FIG. 4 and identifies the overlapping areas 34B to 34D, 34F to 34H and 34J to 34L (S13).

The image data division unit 21 divides the image data (partial image data) belonging to the respective overlapping areas 34B to 34D, 34F to 34H and 34J to 34L in the vertical direction of the screen (S14).

The respective divided image data are sent out by the distribution unit 22 to the data compression units according to the corresponding divided areas (S15).

The data compression units 23B to 23D, 23F to 23H and 23J to 23L compress the received divided image data according to the contents of the received dictionary memories 24B to 24D, 24F to 24H and 24J to 24L (S16). Furthermore, according to the algorithm of the LZ77 method, the most recently compressed data are stored in the dictionary memories 24B to 24D, 24F to 24H and 24J to 24L and these dictionary memories are thereby updated. When the capacity of the dictionary memory reaches an upper limit, data are erased sequentially starting with the oldest data.

The divided image data compressed by the data compression units 23B to 23D, 23F to 23H and 23J to 23L are transmitted by the multiplexing unit 25 starting with those located at higher positions in the screen followed by those located closer to the left side as shown in FIG. 5 (see arrows in FIG. 5) (S17).

As shown above, according to the present embodiment, a dictionary memory is assigned to each divided area resulting from dividing the screen, the image data generated is divided for each divided area and compressed, and it is thereby possible to obtain a high compressibility. In many cases, there are many common parts between image contents before and after an update. For example, when the screen contents are scrolled in the vertical direction or horizontal direction, the scrolled screen contents correspond to the screen contents before scrolling shifted by only a few pixels and contents other than the portions at the end of the area viewed in the scrolling direction are common. Therefore, when image data belonging to each overlapping area (that is, image data belonging to each divided area) is compressed using the dictionary memory for each divided area, compression at an extremely high compressibility can be expected. Furthermore, when image data are successively compressed by updating the screen contents, a high compressibility can be likewise expected. When compression is performed with one dictionary memory assigned to the entire screen instead of dividing the entire screen, there is a high possibility that the contents of the dictionary memory may be data of an area independent of the data to be compressed hereafter, and therefore the high compressibility described above cannot usually be obtained.

Furthermore, according to the present embodiment, image data belonging to an overlapping area is divided in the vertical direction so as to have a height width on the order of font size of a character, the divided image data are transmitted from top to bottom in units of horizontal row, and therefore when characters are written horizontally, the direction in which the user reads characters matches the direction in which characters are displayed (drawn) and characters are displayed at high speed, which allows the user to read characters easily even during drawing and improves visibility.

That is, when image data belonging to each overlapping area is compressed and transmitted without being divided, the updated screen drawn on the screen reception terminal 12 is drawn so that vertically oriented rectangles are displayed in a plurality of steps in the horizontal direction at low speed (e.g., image data 34F, 34G and 34H are drawn in this order). When image data are written horizontally from top to bottom, even if one vertically oriented rectangle (e.g., image of 34F, 34G, 34H) is drawn, there is little information that can be read from there and it is difficult for the user to understand the screen contents until all updated images (e.g., image in 34F to 34H) are drawn in the horizontal direction.

In contrast, the present embodiment divides image data belonging to each overlapping area in the vertical direction so that the divided image data has a height width on the order of font size of a character, and transmits the divided image data in units of horizontal row from top to bottom. Therefore, the direction in which the user reads characters matches the direction in which characters are displayed (drawn) and the speed at which characters are displayed in that direction is also increased, and this allows the user to read characters more easily even during drawing and improves visibility. Furthermore, when image data are drawn from left to right, the direction/sequence in which data are drawn matches the direction/sequence in which data are written in the actual document, and therefore visibility further improves. In this case, the dictionary memory used for compression of the divided image data is the dictionary memory assigned to the rectangular area to which the divided image data corresponds, and therefore the compressibility is also maintained. Furthermore, substantially no overhead due to the division is produced on the screen reception terminal 12.

According to the present embodiment explained so far, the ratio of vertical length M to horizontal length N of each rectangular area can be any value, but when it is anticipated that the frequency at which the scrolling operation of screen contents in any one of the vertical and horizontal directions will be higher than that in the other direction, setting the ratio of M to N so that the side in the one direction becomes longer can obtain a further greater effect of compression.

When, for example, it is anticipated that the frequency at which scrolling in the vertical direction will be higher than that in the horizontal direction, the length M of the vertical side is made greater than the length N of the horizontal side of each rectangular area. However, suppose the value of M×N is constant.

By so doing, it is possible to reduce the area of the edge part of the scroll area which does not remain in the dictionary memory out of the updated image data when scrolling is performed, that is, the area of the part that remains in the dictionary memory increases, and therefore the effect of compressibility is greater than that when, for example, the rectangular area is close to square.

Furthermore, the present embodiment has shown an embodiment assuming that characters are written horizontally, but when, for example, characters are written vertically, by dividing image data (partial image data) belonging to each overlapping area in the horizontal direction and transmitting image data closer to the right side with higher priority, it is possible to improve visibility. That is, by sequentially transmitting a vertical column from right to left, the direction in which the user reads characters matches the direction in which characters are displayed (drawn) and the speed at which characters are displayed also increases, and therefore visibility can be improved. When a plurality of pieces of divided image data are located at the same position in the horizontal direction, transmitting those located at higher positions on the screen with higher priority makes it possible to obtain better visibility. The horizontal width of division is preferably equivalent to or less than, for example, the horizontal width of the character display size.

An example where one dedicated dictionary memory is assigned to each rectangular area has been shown so far, but an example where a plurality of dictionary memories are assigned to one rectangular area will be shown below as three patterns; No. 1, No. 2 and No. 3.

(No. 1)

Figure 7:
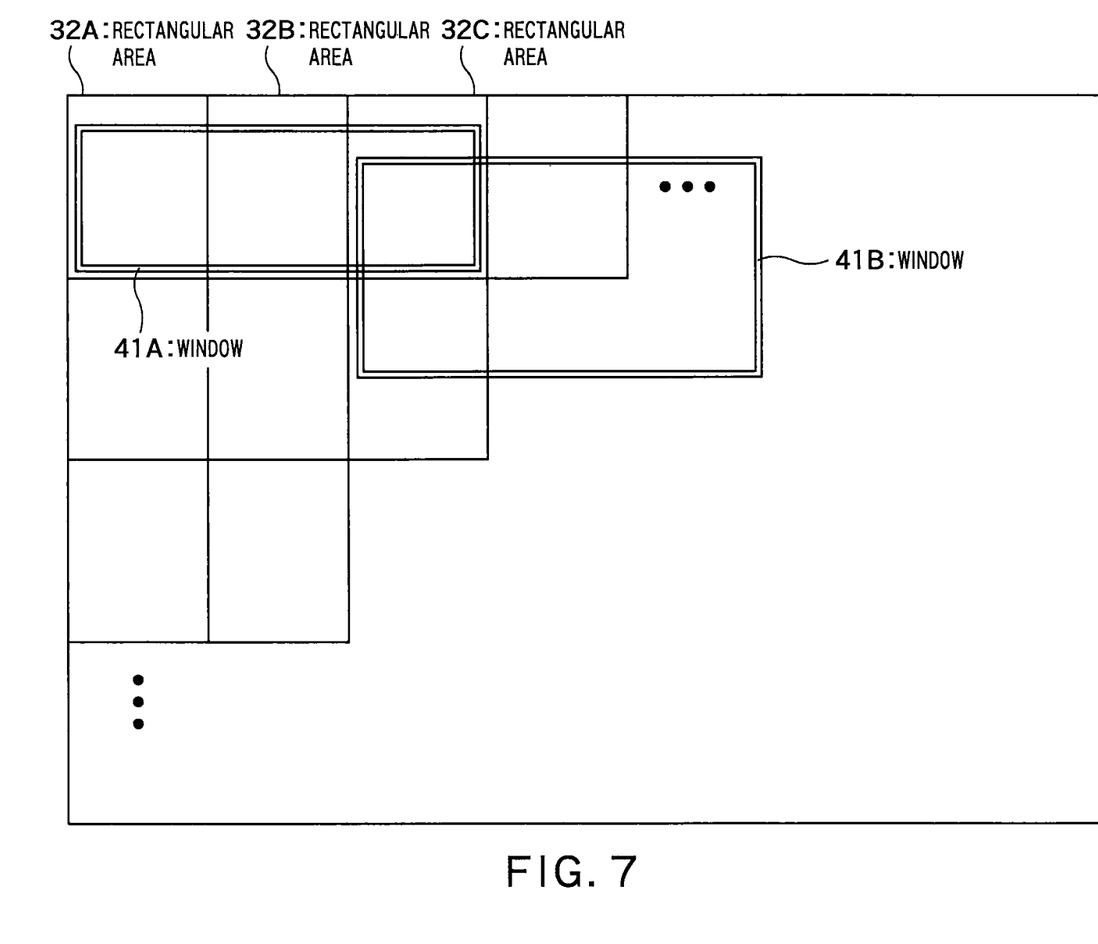
FIG. 7 illustrates an example where a plurality of dictionary memories are assigned to one rectangular area.

FIG. 7 shows a screen example where a window system is used. Two windows, that is, a window 41A and a window 41B overlap each other within a rectangular area 32C.

Of the window 41A and window 41B, changing the window to be displayed uppermost causes the contents of overlapping part of the windows 41A and 41B in the rectangular area 32C to be changed.

In such a case, instead of assigning one dictionary memory to each rectangular area, the same number of dictionary memories as overlapping windows within the rectangular area are assigned so as to correspond to the respective windows.

Since two windows overlap each other in the rectangular area 32C, two dictionary memories are assigned to this rectangular area 32C. That is, two dictionary memories 24C and 24C' are assigned to the data compression unit 23C. The dictionary memory 24C is assigned to the window 41A and the dictionary memory 24C' is assigned to the window 41B. Here, it has been assumed that the same number of dictionary memories as windows are assigned to one data compression unit, but it is also possible to assign a set of data compression unit and dictionary memory to each window and distribute data to the respective data compression units according to the uppermost window. The same will likewise apply to (No. 2) and (No. 3) which will be described later.

When the screen contents are updated and divided image data are compressed, when the divided image data belongs to the rectangular area 32C, the distribution unit 22 examines the window displayed uppermost and sends an instruction and divided image data to the data compression unit 23C so as to use the dictionary memory 24C when the window 41A is displayed uppermost or the dictionary memory 24C' when the window 41B is displayed uppermost. Alternatively, when a data compression unit is arranged for each of the dictionary memories 24C and 24C', the distribution unit 22 distributes divided image data to the data compression unit corresponding to the dictionary memory 24C when the window 41A is displayed uppermost or distributes divided image data to the data compression unit corresponding to the dictionary memory 24C' when the window 41B is displayed uppermost.

In this way, when the window to be displayed uppermost is changed, the dictionary memory used to compress the screen contents of the window is used again and therefore a higher compressibility is obtained than when there is only one dictionary memory.

(No. 2)

When the screen contents are updated and divided image data are compressed, if the divided image data belong to the rectangular area 32C, the distribution unit 22 examines whether or not divided image data in the rectangular area 32C is included in the actually displayed area out of the entire area of the window 41A and the actually displayed area out of the entire area of the window 41B.

When the divided image data are included in the actually displayed area of the window 41A and not included in the actually displayed area of the window 41B, an instruction and divided image data are sent to the data compression unit 23C so as to use the dictionary memory 24C. Alternatively, when data compression units are arranged for the dictionary memories 24C and 24C' respectively, the distribution unit 22 distributes the divided image data to the data compression unit corresponding to the dictionary memory 24C.

When the divided image data are included in the actually displayed area of the window 41B and not included in the actually displayed area of the window 41A, an instruction and divided image data are sent to the data compression unit 23C so as to use the dictionary memory 24C'. Alternatively, when data compression units are arranged for the dictionary memories 24C and 24C' respectively, the distribution unit 22 distributes the divided image data to the data compression unit corresponding to the dictionary memory 24C'.

When the divided image data are included in both actually displayed areas of the windows 41A and 41B together or included in none of the window actually displayed areas, an instruction and divided image data are sent to the data compression unit 23C so as to use any one of the dictionary memory 24C and dictionary memory 24C'. Alternatively, when data compression units are arranged for the dictionary memories 24C and 24C' respectively, the distribution unit 22 distributes the divided image data to the data compression unit corresponding to any one of the dictionary memories 24C and 24C'. For example, the dictionary memory 24C may always be used or when divided image data are included in both window display areas, the dictionary memory corresponding to the window having a greater area where the image data are included may be used.

(No. 3)

When the screen contents are updated and the divided image data are compressed, upon deciding that the divided image data correspond to the rectangular area 32C, the distribution unit 22 examines whether or not the divided image data are included in the actually displayed area of the window 41A and actually displayed area of the window 41B in the rectangular area 32C.

When the divided image data are included in the actually displayed area of the window 41A and not included in the actually displayed area of the window 41B, the distribution unit 22 sends an instruction and divided image data to the data compression unit 23C so as to use the dictionary memory 24C. Alternatively, when data compression units are arranged for the dictionary memories 24C and 24C' respectively, the distribution unit 22 distributes divided image data to the data compression unit corresponding to the dictionary memory 24C.

When the divided image data are included in the actually displayed area of the window 41B and not included in the actually displayed area of the window 41A, the distribution unit 22 sends an instruction and divided image data to the data compression unit 23C so as to use the dictionary memory 24C'. Alternatively, when data compression units are arranged for the dictionary memories 24C and 24C' respectively, the distribution unit 22 distributes divided image data to the data compression unit corresponding to the dictionary memory 24C'.

When the divided image data are included in both actually displayed areas of the windows 41A and 41B together, the divided image data are divided (or separated) into a plurality of portions so that the divided image data do not extend over the other window and a plurality of pieces of separate image data are generated. Dictionary memories to be used may be changed depending on different pieces of separate image data as described above.

When the divided image data are included in none of window actually displayed areas, the distribution unit 22 sends an instruction and divided image data to the data compression unit 23C so as to use any one of the dictionary memory 24C and dictionary memory 24C'. Alternatively, when data compression units are arranged for the dictionary memories 24C and 24C' respectively, the distribution unit 22 distributes divided image data to the data compression unit corresponding to any one of the dictionary memory 24C and dictionary memory 24C'. For example, the dictionary memory 24C may always be used.

Second Embodiment

The present embodiment has a feature of assigning a dedicated dictionary memory to each window. Hereinafter, the present embodiment will be explained in detail. The block diagram of a PC (screen transfer apparatus) according to the present embodiment is the same as that in FIG. 2.

Figure 8:
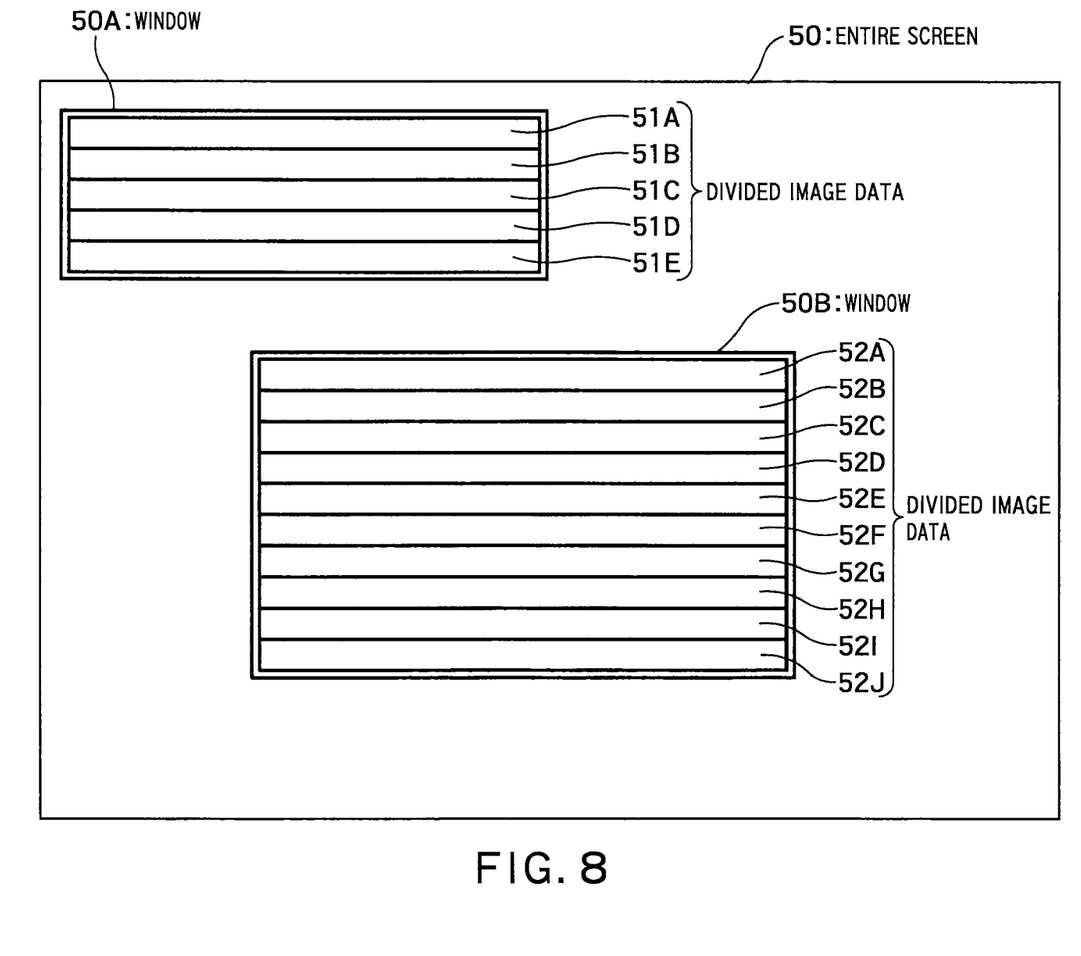
FIG. 8 illustrates an image data division method and distribution method according to a second embodiment.

FIG. 8 illustrates a method of dividing and distributing image data according to the second embodiment. FIG. 8 shows a screen example when a window system is used. Several windows, that is, window 50A, window 50B, . . . are displayed within an entire screen 50.

The window 50A is assigned a data compression unit 23A and a dictionary memory 24A, and the window 50B is assigned a data compression unit 23B and a dictionary memory 24B. A data compression unit and a dictionary memory are also assigned to the remaining area of the entire screen 50 other than the areas of the windows 50A and 50B.

Figure 9:
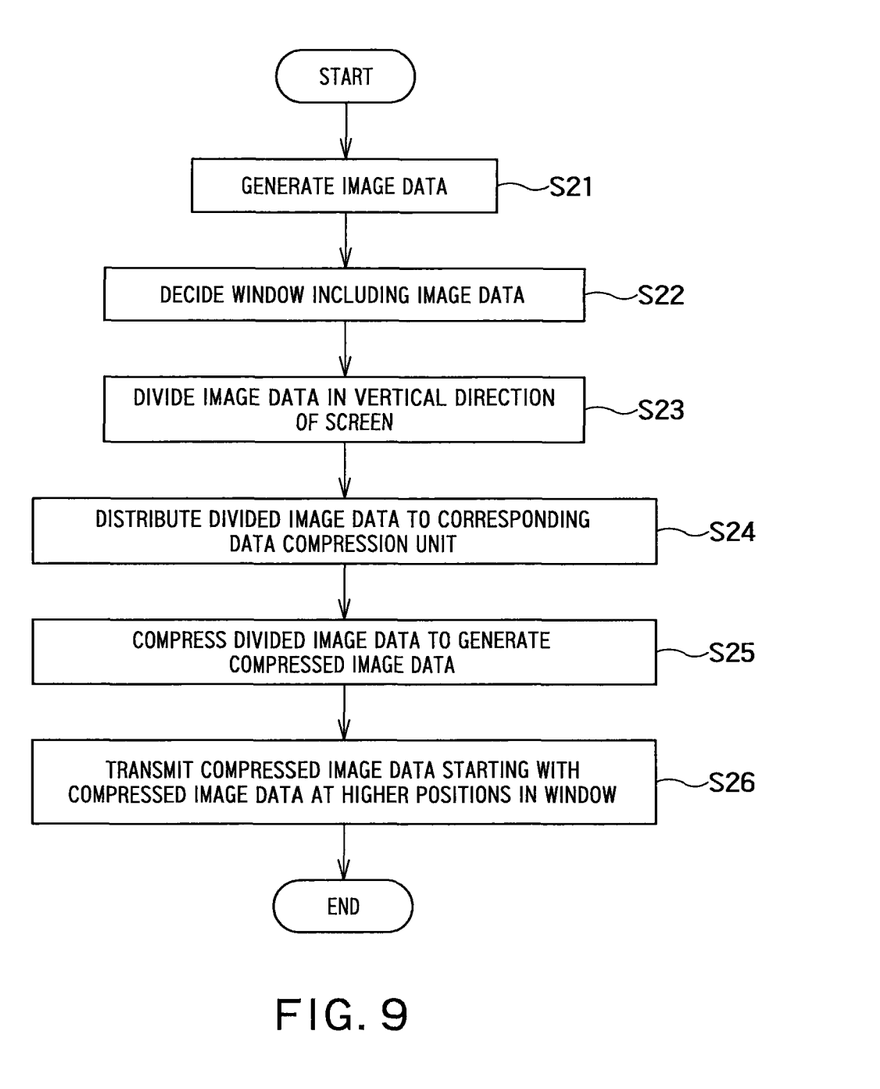
FIG. 9 is a flowchart showing an example of processing flow of the screen transfer apparatus according to the second embodiment.

FIG. 9 is a flowchart showing an example of a processing flow of the PC (screen transfer apparatus) 11 according to the present second embodiment.

When screen contents are updated, the image data area decider 19 decides an area to be drawn and the image data generation unit 20 generates image data to be displayed in the area (S21).

The image data division unit 21 decides the window to which the image data belongs (S22). Furthermore, the image data division unit 21 divides the image data in the vertical direction of the screen and generates divided image data (S23). For example, when the image data of the entire window 50A are generated, the image data division unit 21 divides the image data generated and obtains divided image data 51A to 51E. Alternately, when the image data of the entire window 50B are generated, the image data division unit 21 divides the image data and obtains divided image data 52A to 52J. At the time of division, if the vertical width of division is set to the order of the vertical width of character font or less, visibility improves as in the case of the first embodiment. Furthermore, as in the case of the first embodiment, at the time of division of image data, if the data size of divided image data is made to be equal to or greater than the length of a data pattern that can be copied and equal to or less than the capacity of dictionary memory, a high compressibility can be expected.

The divided image data generated by the image data division unit 21 are distributed to the data compression units by the distribution unit 22 so as to be compressed in the window dictionary memory to which the divided image data belong (S24). For example, when the divided image data belong to the window 50A, the divided image data are distributed to the data compression unit 23A so as to use the dictionary memory 24A. When the image data do not belong to any window, the divided image data are distributed to the data compression unit corresponding to the dictionary memory assigned to the remaining area so that image data are compressed by the dictionary memory assigned to the remaining area. As in the case of the first embodiment, the data compression units corresponding to the respective dictionary memories may be merged into one data compression processor so that the data compression processor uses different dictionary memories (dictionary memories remain plural).

The data compression unit which has received the divided image data compresses the divided image data using the corresponding dictionary memory and updates the dictionary memory (S25).

The multiplexing unit (data transmission unit) 25 sequentially transmits the respective compressed image data starting with those located at higher positions within the window with higher priority (S26).

According to the above described processing, since images of similar contents, for example, partial images of similar graphics are likely to be drawn in the same window, a higher compressibility can be obtained than when the same dictionary memory is assigned to a set of all windows or the entire screen. Furthermore, since contents drawn in the window are divided in the vertical direction and the divided contents are drawn sequentially from top, the direction in which the contents of the window are displayed matches the direction in which the drawing contents are displayed, which allows the user to read characters more easily even during drawing.

The present embodiment has shown an example where a dictionary memory is assigned to each window but when each of a plurality of application programs displays a plurality of windows, a dictionary memory and data compression unit may also be assigned to each application program. The data compression units corresponding to the respective dictionary memories may also be merged into one data compression processor.

Furthermore, when one window is divided into several areas according to a function of linkage between application programs and a plurality of application programs are performing drawing in the respective areas in one window, a data compression unit and dictionary memory may be likewise assigned to each application program included in one window. Data compression units may also be merged into one data compression processor in this case, too.

The image transfer apparatus of this embodiment may also be realized using a general-purpose computer device as basic hardware. That is, the image data area decider 19, the image data generation unit 20, the image data division unit 21, the distribution unit, the data compression units and the multiplexing unit can be realized by causing a processor mounted in the above described computer device to execute a program. In this case, the image transfer apparatus may be realized by installing the above described program in the computer device beforehand or may be realized by storing the program in a storage medium such as a CD-ROM or distributing the above described program over a network and installing this program in the computer device as appropriate.

Furthermore, the dictionary memories may also be realized using a memory device or hard disk incorporated in or externally added to the above described computer device or a storage medium such as CD-R, CD-RW, DVD-RAM, DVD-R as appropriate.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

What is claimed is:

1. A screen transfer apparatus that communicates with a screen display apparatus that displays image data on a screen, comprising:
   an image data generation unit configured to generate image data to be displayed on the screen, with a portion of said image data to be compressed and transferred;
   dictionary memories arranged correspondingly to a plurality of divided areas, each forming a different part of a whole area of the screen, wherein the dictionary memories each store dictionary data for a corresponding one of the divided areas;
   an area identification unit configured to identify overlapped divided areas that include the portion of said image data to be compressed and transferred;
   a division unit configured to divide the image data in each overlapped divided area in a vertical direction or a horizontal direction of the screen to generate pieces of divided image data for each overlapped divided area, a vertical width or a horizontal width of each piece is less than that of the corresponding divided areas;
   a data compression processor configured to compress each piece of the divided image data belonging to each of the divided areas by using to compress a piece of divided image data the dictionary data in a corresponding dictionary memory for the divided area in which that piece resides to generate a corresponding piece of compressed image data for each piece of divided image data, the data compression processor further configured to store each compressed piece of the divided image data belonging to each of the divided areas in each corresponding dictionary memory to update the dictionary data therein; and
   a data transmission unit configured to transmit the compressed image data belonging to each of the divided areas in an order defined by a rule given in advance.

2. The apparatus according to claim 1, wherein the division unit performs division in a vertical direction, and the data transmission unit transmits each piece of the compressed image data so that the piece at a higher position in the vertical direction of the screen is earlier transmitted.

3. The apparatus according to claim 2, wherein the data transmission unit performs transmission, when plural pieces of compressed image data belonging to different divided areas are located at the same height, so that the piece closer to a left side in the horizontal direction of the screen is earlier transmitted.

4. The apparatus according to claim 2, wherein the division unit performs division so that a vertical width of each piece of the divided image data becomes equal to or less than a vertical width of a character font size displayed on the screen display apparatus.

5. The apparatus according to claim 1, wherein the division unit performs division in the horizontal direction of the screen, and the data transmission unit transmits each piece of the compressed image data so that the piece closer to the right side in the horizontal direction of the screen is earlier transmitted.

6. The apparatus according to claim 5, wherein the data transmission unit performs transmission, when plural pieces of compressed image data belonging to different divided areas are located at the same position in the horizontal direction, so that the piece at a higher position in the vertical direction of the screen is earlier transmitted.

7. The apparatus according to claim 5, wherein the division unit performs division so that a horizontal width of each piece of the divided image data becomes equal to or less than a horizontal width of a character font display size displayed on the screen display apparatus.

8. The apparatus according to claim 1, wherein the data compression processor comprises a plurality of data compression units corresponding to the divided areas configured to compress each piece of the divided image data belonging to the respective divided areas by using a corresponding dictionary memory belonging to the respective divided areas.

9. The apparatus according to claim 1, wherein
   the data compression processor performs compression, when data having a same pattern as data in a dictionary memory are included in a piece of the divided image data, by replacing the data in the piece with both a length of the pattern and a distance from a tail end of data stored in the dictionary memory, and
   the division unit performs division so that data size of each piece of the divided image data becomes equal to or greater than an upper limit value of substitutable pattern length given in advance and equal to or less than a capacity of the dictionary memory.

10. The apparatus according to claim 1, wherein
   a plurality of dictionary memories are provided for one of the divided areas in correspondence with a plurality of mutually overlapping windows in that one of the divided areas, and
   the data compression processor compresses each piece of the divided image data belonging to that one of the divided areas by using one of the plurality of dictionary memories corresponding to an uppermost window of the plurality of windows.

11. The apparatus according to claim 1, wherein
   first and second dictionary memories are provided for one of the divided areas in correspondence with first and second windows displayed in that one of the divided areas,
   the data compression processor
     compresses, when a piece of divided image data belonging to that one of the divided areas is displayed in the first window and is hidden by the first window in the second window, the pieces of the divided image data belonging to that one of the divided areas by using the first dictionary memory,
     compresses, when a piece of the divided image data belonging to that one of the divided areas is displayed in the second window and is hidden by the second window in the first window, the piece of the divided image data belonging to that one of the second divided areas by using the second dictionary memory, and
     compresses, when a piece of the divided image data belonging to one of the divided areas is displayed so as to extend over both the first and second window or is displayed in neither of the first and second windows, the piece of the divided image data belonging to that one of the divided areas by using one of the first and second dictionary memories.

12. The apparatus according to claim 1, wherein first and second dictionary memories are provided for one of the divided areas in correspondence with first and second windows displayed in that one of the divided areas, the data compression processor compresses, when a piece of the divided image data belonging to that one of the divided areas is displayed in the first window and is hidden by the first window in the second window, the piece of the divided image data belonging to that one of the divided areas by using the first dictionary memory, compresses, when a piece of divided image data belonging to that one of the divided areas is displayed in the second window and is hidden by the second window in the first window, the piece of the divided image data belonging to that one of the divided areas by using the second dictionary memory, and (i) when a piece of the divided image data belonging to one of the divided areas is displayed so as to extend over both the first and second windows, separates the piece of the divided image data between the first and second windows, compresses first separated image data belonging to the first window by using the first dictionary memory, compresses second separated image data belonging to the second window by using the second dictionary memory, and (ii) when the piece of the divided image data belonging to that one of the divided areas is displayed in none of the first and second windows, compresses the piece of the divided image data belonging to that one of the divided image data belonging to one of the divided areas by using one of the first and second dictionary memories.

13. The apparatus according to claim 1, wherein one side of the divided area in a vertical or horizontal direction is made longer than the other side of the divided areas, wherein a scrolled frequency of the screen in a direction of the one side is higher than that in the other side.

14. A screen transfer method that communicates with a screen display apparatus that displays image data on a screen, comprising:

generating image data to be displayed on the screen, with a portion of said image data to be compressed and transferred;

storing in a dictionary memory or memories dictionary data for each of a corresponding one of a plurality of divided areas, each forming a different part of a whole area of the screen;

identifying overlapped divided areas that include the portion of said image data to be compressed and transferred;

dividing the image data in each overlapped divided area in a vertical direction or a horizontal direction of the screen to generate pieces of divided image data for each overlapped divided area, wherein a vertical width or a horizontal width of each piece is less than that of the corresponding divided areas;

compressing each piece of the divided image data belonging to each of the divided areas by using to compress a piece of divided image data the dictionary data corresponding to the divided area in which that piece resides to generate a corresponding piece of compressed image data for each piece of divided image data;

storing each compressed piece of the divided image data belonging to each of the divided areas in a corresponding portion of the dictionary memory or memories to update the dictionary data therein; and transmitting the compressed image data belonging to each of the divided areas in an order defined by a rule given in advance.

15. A non-transitory computer-readable medium storing a computer program that causes, when executed by a computer, the computer to perform the steps of:

generating image data to be displayed on the screen, with a portion of said image data to be compressed and transferred;

storing in a dictionary memory or memories dictionary data for each of a corresponding one of a plurality of divided areas, each forming a different part of a whole area of the screen;

identifying overlapped divided areas that include the portion of said image data to be compressed and transferred;

dividing the image data in each overlapped divided area in a vertical direction or a horizontal direction of the screen to generate pieces of divided image data for each overlapped divided area, wherein a vertical width or a horizontal width of each piece is less than that of the corresponding divided areas;

compressing each piece of the divided image data belonging to each of the divided areas by using to compress a piece of divided image data the dictionary data corresponding to the divided area in which that piece resides to generate a corresponding piece of compressed image data for each piece of divided image data;

storing each compressed piece of the divided image data belonging to each of the divided areas in a corresponding portion of the dictionary memory or memories to update the dictionary data therein; and transmitting the compressed image data belonging to each of the divided areas in an order defined by a rule given in advance.

* * * * *